May 23, 1950      E. R. DOEPKE      2,508,503

VALVE EXTENSION FOR INNER TUBES

Filed Dec. 14, 1946

INVENTOR.
EDWARD R. DOEPKE
BY
Glenn L. Fish
ATTORNEY

Patented May 23, 1950

2,508,503

UNITED STATES PATENT OFFICE 2,508,503

VALVE EXTENSION FOR INNER TUBES

Edward R. Doepke, Walla Walla, Wash.

Application December 14, 1946, Serial No. 716,336

3 Claims. (Cl. 152—415)

My present invention relates to an improved valve extension for inner tubes and is especially adapted to be used when repairing or replacing vehicle tires and tubes under circumstances conventionally at hand under which the stem of the deflated tube in the tire is difficult to align and insert through the rim opening.

With the extension of my invention the tube stem may receive the device before deflation and the elongated stem will be readily available and accessible through the wheel rim.

In the accompanying drawings I have illustrated two complete examples of the physical embodiment of my invention according to the best mode I have thus far devised, but it will be understood that various changes and alterations may be made in the exemplified structure within the scope of the appended claims.

Figure 1:
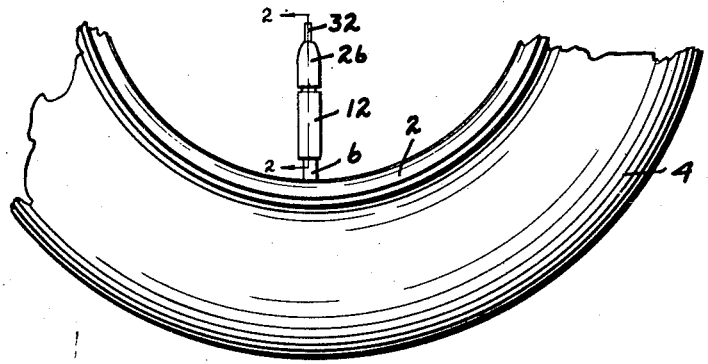
Fig. 1 shows a section of a tire rim and the extension attached to the valve stem.

Referring now to the drawings wherein I have illustrated the present preferred embodiment of my invention I have shown the conventional wheel rim 2 and tire 4 confining a tube not shown and the valve stem 6 has therein a conventional valve core 8 and rod 10.

Adapted to threadedly engage the stem 6 I use a barrel cylinder 12 having a central bore 14 the gasket 16 sealing the stem in the recess of the cylinder. An insert 18 has a central longitudinally extending bore 20 which terminates in a lateral port 21, and a lateral bumper 22 which depresses the rod 10 allowing the air in the tube to pass into the bore 14.

Upwards of the cylinder 12 and threadedly engaging the collar 24 I use a cap 26 formed with a central bore 28, and a lateral port 30. An extension 32 is topped into the bore 14 and has a longitudinal passage 34 with a lateral port 36. A collar 38 on the extension is confined between the flange 40 of the cap 26 and the end of the cylinder 12.

In an upper chamber 42 aligned with the passage 34 is threaded a valve core 44 of conventional design.

Figure 2:
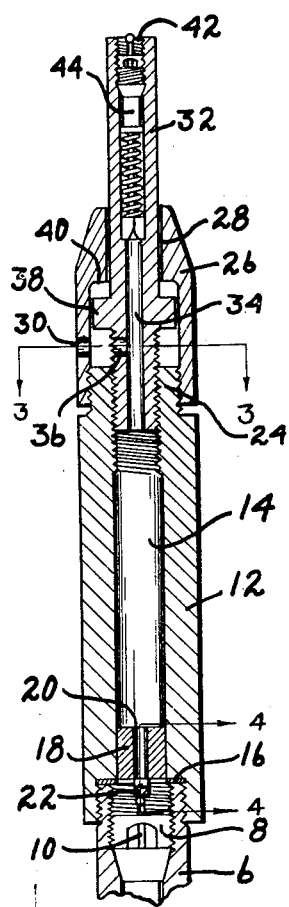
Fig. 2 is a sectional view taken on line 2—2 of Fig. 1.
Figure 3:
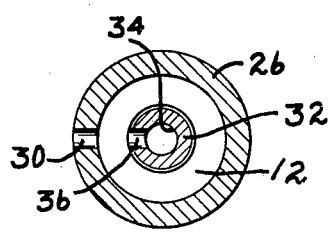
Fig. 3 is a sectional view taken on line 3—3 of Fig. 2 showing the escape ports.
Figure 4:
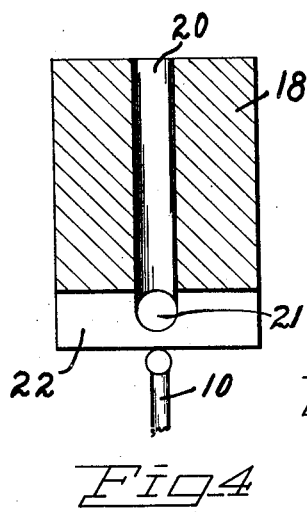
Fig. 4 is a sectional view taken on line 4—4 of Fig. 2

As shown in Fig. 2 the device is arranged to release the air under pressure in the inner tube. By screwing down the barrel 12 bumper 22 of the insert 18 contacts with and depresses rod 10, as in Fig. 4, thus releasing air through the core 8, port 21 and bore 20 to passage 14 of the barrel, and thence through ports 36 and 30. To set the device for the admission of air, the extension 32 is rotated in the cylinder bore 14 until the port 36 is closed and covered by the bore wall 12. Then by applying air pressure to the core 44, the air will pass through passage 34, bore 14, bore 20 and through the core 6.

Reverse movement of the extension will permit discharge of air through core 6, bore 20, bore 14, passage 34, port 36 and port 30.

Figure 5:
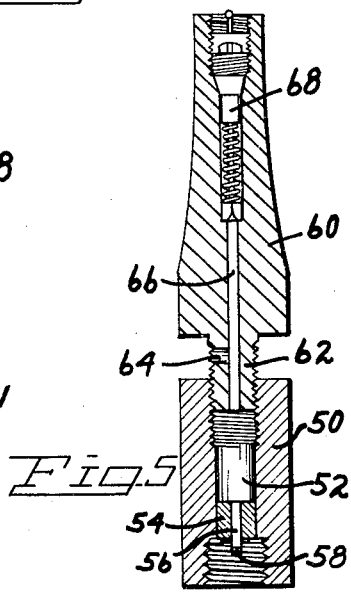
Fig. 5 is a modified form that can also be used as an extension.

In Fig. 5 I have shown a modified form of my invention wherein the barrel 50 is formed with a bore 52 and the insert 54 bored at 56 has a core rod depressing bumper 58.

The extension 60 has a stud 62 formed with a port 64 and central bore 66, the upper portion of the extension being adapted to receive a valve core 68.

When the stud is screwed into the barrel to close port 64 the bleeding of the tube will cease, and air under pressure may be applied into the bore 66, bore 52, passage 56 and to the valve stem and core not shown.

Having thus fully described my invention what I claim as new and desire to secure by Letters Patent is:

1. An extension for valve stems of inner tubes comprising a hollow barrel threaded on the stem, a valved extension threaded on the barrel, port means in the threaded portion of the extension for selectively bleeding the tube or charging the tube, and means in the barrel co-acting with the valve in the stem to render the valve open.

2. An extension for valve stems of inner tubes comprising a hollow barrel threaded on the stem, a valved extension threaded on the barrel, a ported cap over the valved extension forming a chamber, a collar on the extension limiting movement thereof in the chamber, port means in the extension permitting the selective bleeding of the tube into the chamber or the charging of the tube, and means on the barrel co-acting with the valve in the stem to render the valve open.

3. An extension for valve stems of inner tubes comprising a hollow barrel threaded on the stem, a valved extension threaded on the barrel, a ported cap over the valved extension forming a chamber, means on the extension limiting movement thereof in the chamber, port means in the extension permitting the selective bleeding of the tube into the chamber or the charging of the tube, and a ported insert in the barrel and a bumper co-acting with the valve in the stem to render the valve open.

EDWARD R. DOEPKE.

REFERENCES CITED

The following references are of record in the file of this patent:

UNITED STATES PATENTS

| Number | Name | Date |
|---|---|---|
| 2,043,380 | Kirkpatrick et al. | June 9, 1936 |
| 2,158,576 | Glassley | May 16, 1939 |

FOREIGN PATENTS

| Number | Country | Date |
|---|---|---|
| 298,827 | Italy | 1932 |